July 27, 1954 S. W. K. MORGAN 2,684,899
PROCESS OF SMELTING OXIDIZED ZINC ORES
Filed July 11, 1950 2 Sheets-Sheet 1

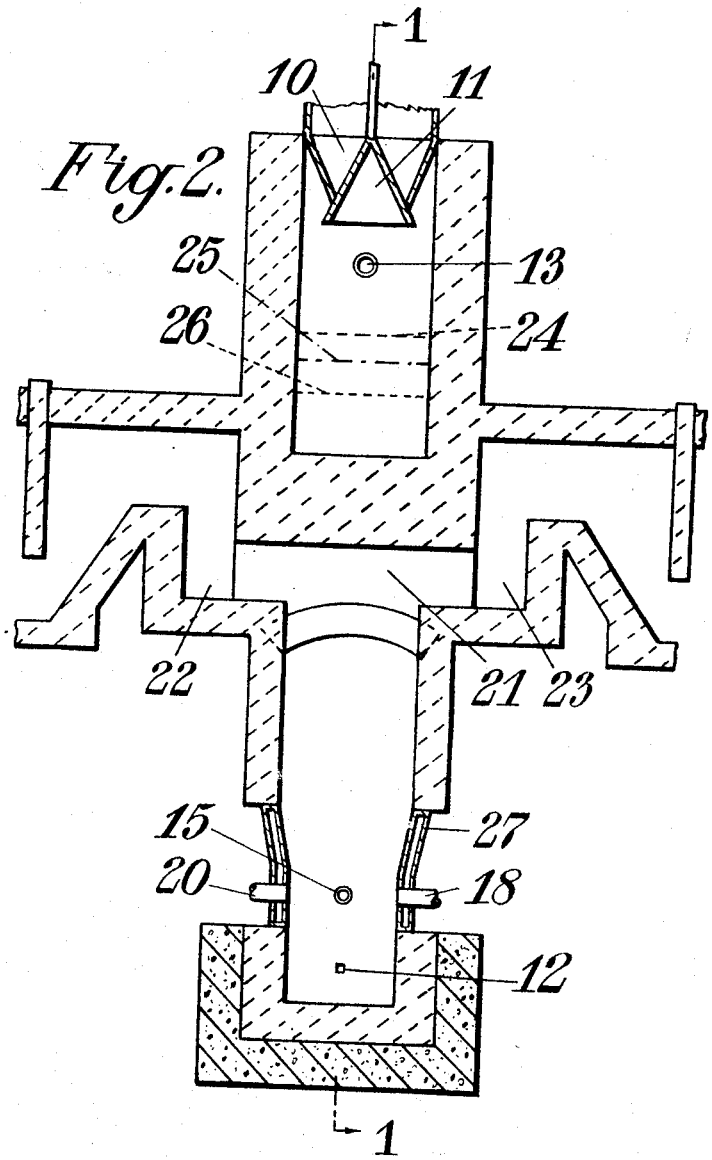

Patented July 27, 1954

2,684,899

UNITED STATES PATENT OFFICE 2,684,899

PROCESS OF SMELTING OXIDIZED ZINC ORES

Stephen William Kenneth Morgan, Bristol, England, assignor to The National Smelting Company Limited, London, England Application July 11, 1950, Serial No. 173,153

Claims priority, application Great Britain August 5, 1949

4 Claims. (Cl. 75—87)

This invention relates to the smelting of zinc ores in a blast furnace i. e. a furnace in which the charge is introduced at the top and the solid residues removed from the bottom of the furnace in the form of molten slag so that the furnace can operate in a continuous manner; and more particularly to the type of blast furnace which is hermetically sealed at the top, air being introduced both at the top and at the bottom of the furnace with an outlet for the furnace gases arranged in between.

According to previous proposals the air introduced towards the top of the furnace has been introduced by tuyères blowing into the furnace from the side, below the level of the top of the charge.

It has now been discovered that such a method of operation leads to slagging of the charge in the upper part of the furnace with consequent inefficient extraction of zinc.

If slagging occurs in the zone of high temperatures near the top of the furnace, this slag freezes again as it descends to the cooler zone immediately beneath. This frozen slag tends to form an accretion starting from the side of the furnace and finally almost bridging the furnace so that charge can no longer flow freely down. This effect represents the most undesirable consequence of slagging in the upper part of the furnace.

A small amount of incipient fusion of some of the charge components would probably not produce this undesirable effect.

It is an object of the invention to prevent any substantial slagging of the charge in the upper part of the furnace.

According to the invention air is introduced into the space in the furnace above the top of the charge. By this means a current of air is forced through the upper part of the charge from the top downwards and the air pressure as it meets the charge instead of being concentrated at a tuyère outlet is evenly distributed over the top surface of the charge.

It has been further discovered that even with the introduction of air over the top of the charge there is with a certain type of charge used in practice, a limit to the proportion of air which can be so introduced if slagging is not to occur at the top of the furnace.

Further, according to the invention the proportion of air introduced over the top of the charge does not exceed 60%.

It has been further discovered that the maximum temperature at the top of the furnace can be still further reduced by causing endothermic reactions to take place in the hottest zone. Such reactions are the reaction of zinc oxide and carbon to give gaseous zinc and carbon monoxide, the decomposition of calcium carbonate to give the oxide and carbon dioxide, and the reduction of carbon dioxide by carbon to give carbon monoxide.

In practice the first of these reactions is achieved by adding oxidized zinciferous material briquetted with carbonaceous material, and the third by suitably selecting the form of coke used to have the desired reactivity. The degree to which the second reaction occurs is of course controlled by the amount of calcium carbonate added to the charge.

An embodiment of the invention is shown in the accompanying drawings.

Figure 2 is a section on the line 2—2 of Figure 1.

Figure 1:
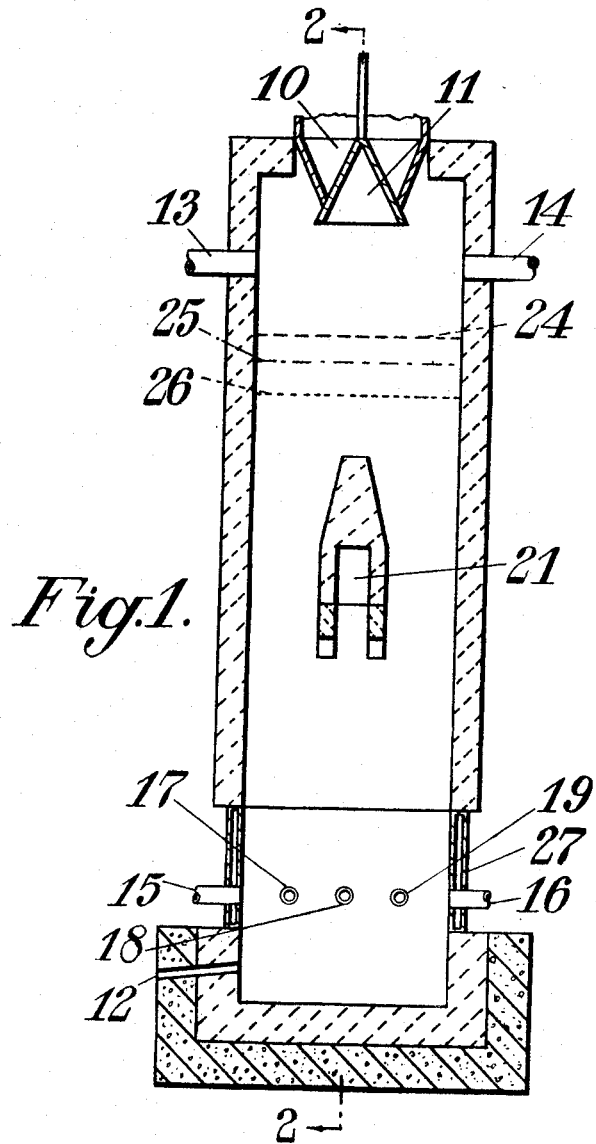
Figure 1 is a vertical section on the line 1—1 of Figure 2.

In the embodiment the charge consists of oxidized zinc ore (prepared by roasting zinc blende in a manner which ensures control of the grain size i. e. so as to yield a sintered product which can be broken down to lumps with a porous honeycomb structure) and coke as its main components. To this are added such amounts of other substances as are needed to flux the gangue of the ore and the ash of the coke to form a suitable fluid slag. Generally lime and silica are added as the fluxes and a typical charge consists of:

| | Parts |
|---|---|
| Oxidized zinc ore | 100 |
| Coke | 80 |
| Limestone | 8 |
| Sand or quartzite | 9 | the parts being measured by weight.

There may also be charged some oxidized zinciferous material briquetted with carbonaceous material.

The charge is preheated preferably to between 800° C. and 900° C. and is introduced by means of a charging device comprising a hopper 10 fitted with a bell 11, into the top of a vertical blast furnace of rectangular horizontal section.

The charging device when closed provides an hermetic seal at the top of the furnace and the rate of introduction of charge is controlled so as to leave an appreciable space above the level of the top of the charge. This space is supplied with air, preferably with a preheated air blast through pipes 13 and 14, so that this air enters the charge over the whole of its free surface 24.

An air blast, preferably preheated, is also introduced through tuyères 15, 16, 17, 18, 19 and 20 at the bottom of the furnace and the bottom of the furnace is enclosed in a water jacket 27 to control the temperature generated there by the air blast and hence the temperature and fluidity of the slag which is to be tapped from the bottom of the furnace through tap hole 12.

At an intermediate height in the furnace are provided gas offtakes 22 and 23, the gases being conducted to the offtake or offtakes by a horizontally disposed inverted trough 21 extending across the furnace.

Considering now the reaction occurring in the furnace when air is introduced into a hot mixture of coke and oxidized zinciferous material, the first reaction that takes place is oxidation of carbon to carbon dioxide by the reaction:

$$C + O_2 = CO_2 \tag{1}$$

Provided that the charge is preheated to above 800° C., this is an intrinsically fast reaction, and the rate at which it proceeds is limited only by the rate at which the oxygen can gain access to the coke surface. Consequently this reaction has proceeded to the point at which very little free oxygen is left in the gas within a short distance, of the order of a foot, from the top of the charge. Reaction 1 is strongly exothermic, and the heat liberated tends to raise the temperature considerably.

A second reaction, between carbon and carbon dioxide, then begins to take place:

$$C + CO_2 = 2CO \tag{2}$$

The speed at which this reaction proceeds is less than for Reaction 1, its intrinsic rate rises with temperature. Consequently, as carbon dioxide is formed, and the temperature raised, as Reaction 1 proceeds, the endothermic Reaction 2 starts, thus tending to reduce the temperature.

The carbon monoxide generated by Reaction 2 then reacts with zinc oxide to produce zinc vapour.

$$CO + ZnO = Zn(gas) + CO_2 \tag{3}$$

Reaction 3 is endothermic, but unlike Reaction 2, is intrinsically rapid, its rate being controlled only by the rate at which carbon monoxide gains access to zinc oxide and by the equilibrium; the higher the temperature, the more can it proceed, as shown, from left to right. Consequently, as soon as any carbon monoxide is generated by Reaction 2, it begins to reduce zinc oxide according to Reaction 3.

Consequently, starting from the top of the furnace where the air enters, there is a steep rise of temperature and carbon dioxide content up to a point where all the oxygen has been consumed; this point may be about a foot below the top of the charge. There is then a sharp fall of temperature in a zone where both Reactions 2 and 3 are proceeding rapidly; this may be between one foot and two feet below the top of the charge. These two endothermic reactions proceed partly at the expense of the concomitant drop in sensible heat content of the gases, and partly from heat received directly by radiation and conduction from the neighbouring hot zone where Reaction 1 is proceeding. As the temperature falls, Reaction 2 becomes slower, while Reaction 3 continues to proceed rapidly. Consequently a condition is soon reached at which Reaction 3 has proceeded to equilibrium at the prevailing temperature.

With regard to the question of introducing all the air at the top, we have found experimentally that it is inadvisable to use, at most, more than 60% of the total air at the top. If 80% of the air is introduced at the top and 20% at the bottom, temperatures over 1,200° C. are attained at the top and slagging occurs there. The reason for this can readily be understood. The ratio of carbon to zinc oxide used has to be such that all the zinc can be reduced and vaporized and a gas containing not more than 8% carbon dioxide, preferably less, is finally withdrawn from the furnace. If all the air is introduced at the top, the manner in which the reactions proceed there means that at some stage all the zinc will be vaporized and all the oxygen consumed at a point where the carbon dioxide content of the gas is high, and that further reduction of this carbon dioxide by Reaction 2, with a consequent fall in temperature, will occur before the gases leave the furnace. If the overall heat balance for the furnace is satisfied, this means that the heat balance in the top zone can be satisfied only if the temperature there is very high.

It will be obvious that, the more rapid Reaction 2, the less intense will be the high temperature zone near the top.

Use of a more than usually reactive coke or other carbonaceous fuel may make possible the use of a higher proportion of air at the top without causing excessive temperatures by assisting Reaction 2 but with commercially available types of coke, gas-works and metallurgical, an upper limit of 60% top air is necessary.

Also, any briquettes containing carbon and oxidised zinciferous material when heated above a certain temperature will generate zinc vapour and carbon monoxide according to the reaction:

$$ZnO + C = Zn\ (gas) + CO \tag{4}$$

The detailed mechanism of this reaction is by Reactions 2 and 3, but with the two reactants in intimate contact the total reaction becomes effectively that of Equation 4. This highly endothermic reaction helps to prevent the temperature from rising unduly. One reason for adding zinciferous material in a briquetted form is to facilitate treatment of fumes and drosses which by themselves are not in a suitable physical form for charging to the furnace. This use of briquettes brings with it the advantage of causing to take place a highly endothermic reaction in a region where the exothermic reactions predominate.

The fumes and drosses may be by-products of a blast-furnace zinc smelting process. The gases from the furnace are conducted to a condenser, where as much as possible of the zinc vapour is condensed to liquid metal. Some oxidation of zinc occurs and gives rise to dross. Any zinc which escapes from the condenser may be collected as a fume. It is found convenient to briquette all these materials, incorporating carbon, such as coke breeze, in the briquettes, for charging to the furnace. By-products from other sources could, of course, be similarly treated.

Also, any limestone, or other form of calcium carbonate, in the charge becomes decomposed as soon as the temperature rises sufficiently high:

$$CaCO_3 = CaO + CO_2 \tag{5}$$

This endothermic reaction helps to extract heat in the hottest zone.

Finally, heat is conducted and radiated from the hottest zone to the adjacent cooler zone where Reactions 2 and 3 are taking place. In the drawings the level 25 may be taken as showing where the highest temperature is attained, while between levels 25 and 26 is the region where there is a sharp temperature drop owing to the endothermic Reactions 2 and 3. The space between levels 25 and 26 may be taken to represent the volume needed to give time for Reaction 2 to take place. The hot zone 25 is separated on a wide front and by a relatively small distance from the cooler zone 26, and therefore considerable transfer of heat takes place, so that there is a considerable reduction of the temperature that would otherwise be attained at the level 25. On the other hand, if air is introduced through tuyères below the top of the charge, the hottest zone is attained on a narrow front around each tuyère and heat cannot be transferred so effectively to the colder zone where Reaction 2 has taken place. Therefore, with tuyères the localized hot zones reach a higher temperature than when the air is introduced over the whole surface of the top of the charge.

I claim:

1. In the blast furnace smelting of oxidized zinc ores in which a preheated charge of the zinc ore, carbonaceous fuel and slag-forming material is introduced through the hermetically sealed top of the furnace and heat is internally provided by combustion of carbon by air introduced at both the top and bottom of the furnace and the furnace gases are withdrawn at an intermediate height in the furnace and molten slag is removed from the bottom of the furnace, the improvement which comprises delivering the air introduced at the top of the furnace into a space provided by controlled introduction of the charge between the furnace top and the top surface of the charge whereby the air is evenly distributed over the top surface of the charge and forced downwardly through the charge and thereby maintaining in the upper part of the charge by the highly exothermic combustion of carbon with formation of carbon dioxide a high temperature zone but insufficient to cause any substantial slagging of the charge, maintaining below said high temperature zone a smelting zone of lower temperature in consequence of the endothermic reductions in that zone of carbon dioxide and oxidized zinc compounds, and withdrawing the furnace gases from a zone below said smelting zone.

2. The improvement according to claim 1 in which the proportion of air introduced into the space between the furnace top and the top surface of the charge does not exceed 60% of the total air introduced into the furnace at both the top and bottom thereof.

3. The improvement according to claim 1 which comprises promoting the temperature-lowering effect of the endothermic reactions of the smelting zone upon the high temperature zone by introducing part of the furnace charge in the form of oxidized zinciferous material briquetted with carbonaceous material.

4. The improvement according to claim 1 which comprises promoting the temperature-lowering effect of the endothermic reactions of the smelting zone upon the high temperature zone by including in the furnace charge a carbonaceous fuel having high reactivity in reducing carbon dioxide to carbon monoxide.

References Cited in the file of this patent

UNITED STATES PATENTS

| Number | Name | Date |
| --- | --- | --- |
| 1,513,775 | Waring | Nov. 4, 1924 |
| 1,759,559 | Job | May 20, 1930 |
| 1,885,412 | Buskett | Nov. 1, 1932 |
| 2,073,994 | Queneau | Mar. 16, 1937 |
| 2,461,697 | Queneau | Feb. 15, 1949 |
| 2,492,438 | Peirce | Dec. 27, 1949 |